D. W. TRAVIS.
HORSE HAY-RAKE.

No. 190,696. Patented May 15, 1877.

Witnesses:
Dudley W. Travis.
Inventor.

UNITED STATES PATENT OFFICE.

DUDLEY W. TRAVIS, OF ITHACA, NEW YORK.

IMPROVEMENT IN HORSE HAY-RAKES.

Specification forming part of Letters Patent No. 190,696, dated May 15, 1877; application filed January 15, 1877.

*To all whom it may concern:*

Be it known that I, DUDLEY W. TRAVIS, of Ithaca, Tompkins county, New York, have invented an Improved Horse-Rake, of which the following is a specification, reference being had to the accompanying drawings.

My object is to facilitate the dumping of rakes; and my invention consists of a shaft that lies parallel to and in connection with and fast to the rider or lifting bar, and which has an arm on one or both ends of the shaft, which, at the will of the operator, is brought in contact with the cogs of a cog-wheel secured on the inside of one or both wheels, and which arm, by its hooked end, grasps the teeth of the cog wheel or wheels, at the will of the operator, as soon as the rake is loaded, when the hook holding in the cogs, by the arm, pulls on the rider-bar, and the rider-bar, by its staples, raises the teeth of the rake. The hooks are then, either directly by the operator or through an automatic device, released, the teeth fall and resume raking, aided by a separate hand-lever or other dumping apparatus, if thought best or necessary. A cam-surface on the arm bears on the cogs and detaches the hook from the cogs.

Figure 1:
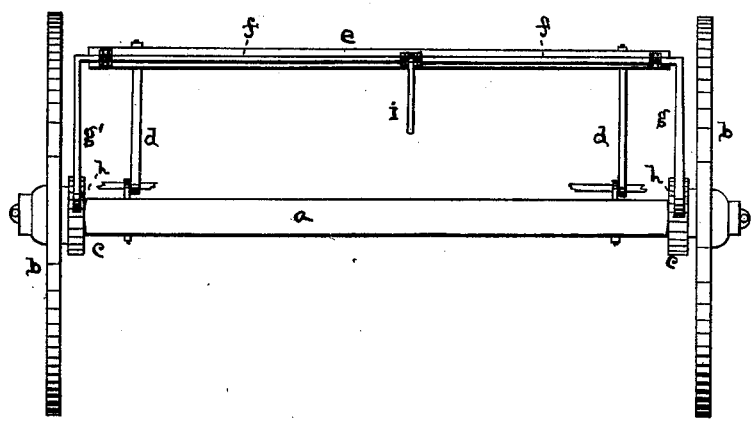
Figure 2:
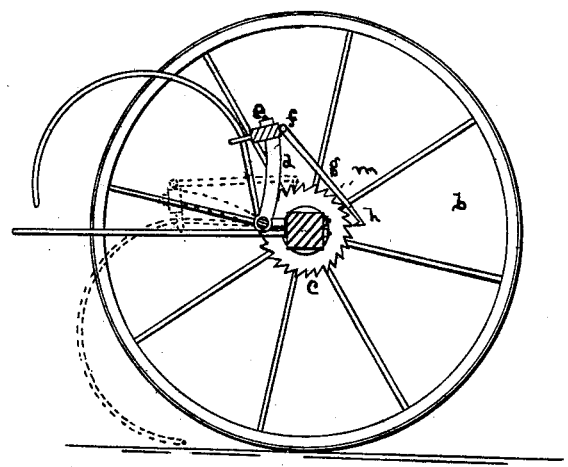

Figure 1 is a view from above of a rider-bar, wheels, arms, and cog-wheels, many of the well-known parts of a rake being omitted. Fig. 2 is a sectional elevation of a rake with my invention.

In the figures, $a$ is an axle, and $b$ its wheels, having the cog-wheels $c$ fast to the hubs, and $d$ are the rods that hold the rider or lifting bar $e$ to the head, which is hinged in rear of a non-rotating axle. The shaft $f$ is seen lying on the top of the rider-bar, and to be fast to it, and parallel to it, and with its ends bent to make the arms $g$, which have hooks $h$, that make connection with the cogs $c$. A hand-lever, $i$, operates the shaft and arms, at will. The lever $i$ also represents a point or means of connection of the shaft to any form of dumping device that may be convenient or advisable to use, for it is always best not to depend alone on any dumping means operated by the power of the horse, either directly or indirectly, because emergencies require one to dump rakes by devices at the command of the operator; and as I cannot represent all such means, I have drawn none beyond the lever $i$; but I declare that it is a part of my invention to combine, by any convenient means, my shaft with other dumping apparatus.

In Fig. 2 is seen a section of my shaft, and also the arm, a cog-wheel on a hub, and other parts familiar to rake makers and users; and it will be noticed that the arm $g$ has the hook $h$, and that just in rear of the hook the under surface of the arm rests on the teeth of the cog-wheel. This surface acts as a cam for the purpose of detaching, as shown, the hook from the tooth in which it has caught. More particularly, the dotted lines show the position of the teeth, arm, and hook just as the operator has depressed the hook into a tooth and commenced dumping the rake. As the rake-wheel revolves the diversity of centers of the head and axle brings the surface $m$ of the arm against the cogs, as shown, by the continuous lines, and a further revolution throws the hook out, and thus the falling of the teeth becomes automatically indicated to the operator, or is accomplished.

I claim—

The rod $f$, lying longitudinally upon and attached to the rider-bar, and having pawl-arms $g$ rigidly attached to its ends, in combination with ratchets upon the wheel-hubs, and with an operating-lever, or suitable connections to independent dumping apparatus, substantially as described.

DUDLEY W. TRAVIS.

Witnesses:
S. J. PARKER,
CHS. G. DAY.